United States Patent [19]

Khouri

[11] Patent Number: 5,231,132
[45] Date of Patent: Jul. 27, 1993

[54] POLYPHENYLENE ETHER-POLYESTER BLENDS COMPATIBILIZED WITH ORTHO ESTER COPOLYMERS

[75] Inventor: Farid F. Khouri, Clifton Park, N.Y.

[73] Assignee: General Electric Company, Schenectady, N.Y.

[21] Appl. No.: 716,159

[22] Filed: Jun. 17, 1991

[51] Int. Cl.$^5$ .................. C08L 67/02; C08L 71/12
[52] U.S. Cl. .................... 525/92; 525/133; 525/397; 525/905
[58] Field of Search .............. 525/92, 397, 905, 133

[56] References Cited

U.S. PATENT DOCUMENTS

| | | | |
|---|---|---|---|
| 4,806,297 | 2/1989 | Brown et al. | 525/905 |
| 4,866,126 | 9/1989 | Mylonakis et al. | 525/68 |
| 4,866,130 | 9/1989 | Brown et al. | 525/905 |
| 4,892,904 | 1/1990 | Ting | 525/92 |
| 5,015,698 | 5/1991 | Sybert et al. | 525/391 |
| 5,037,897 | 8/1991 | Glans et al. | 525/397 |
| 5,132,361 | 7/1992 | Shea et al. | 525/132 |
| 5,132,373 | 7/1992 | Khouri et al. | 525/132 |

Primary Examiner—James J. Seidleck
Assistant Examiner—Thomas Hamilton, III
Attorney, Agent, or Firm—William H. Pittman

[57] ABSTRACT

Compatible polyphenylene ether-poly(alkylene dicarboxylate) blends contain an impact modifier and, as a compatibilizing agent, a copolymer of an alkenyl aromatic compound and a polymerizable cyclic ortho ester, typically an ortho ester acrylate such as 4-acyloyloxymethyl-2-methoxy-2-methyl-1,3-dioxolane.

19 Claims, No Drawings

POLYPHENYLENE ETHER-POLYESTER BLENDS COMPATIBILIZED WITH ORTHO ESTER COPOLYMERS

This invention relates to resinous compositions having a combination of advantageous properties, including solvent resistance, high impact strength, favorable tensile properties and thermal stability. More particularly, it relates to improved polyphenylene ether-polyester compositions.

An increasing trend in recent years is the employment of resinous compositions as a replacement for metals. Among the properties demanded for such compositions is solvent resistance, particularly resistance to petroleum liquids such as gasoline. Other desirable properties are high impact strength, hydrolytic stability, dimensional stability, toughness, heat resistance and dielectric properties.

Many of these properties are possessed by polyphenylene ethers; some, however, such as solvent resistance, are not. Therefore, it would be desirable to blend the polyphenylene ethers with resins having the desired properties. For example, poly(alkylene dicarboxylates), especially the poly(alkylene terephthalates) have a high degree of crystallinity and thus are highly resistant to solvents. Other linear polyesters, including polyarylates, have other valuable properties.

However, polyphenylene ether-polyester blends are incompatible and frequently undergo phase separation and delamination. They typically contain large, incompletely dispersed polyphenylene ether particles and no phase interaction between the two resin phases. Molded parts made from such blends are typically characterized by brittleness and extremely low impact strength.

Various methods for compatibilizing polyphenylene ethers and polyesters have been developed. They include the use of polycarbonates, as disclosed, for example, in U.S. Pat. Nos. 4,866,130 and 4,935,472, and the use of copolymers formed by the reaction of functionalized polyphenylene ethers with polyesters, as disclosed, for example, in U.S. Pat. No. 5,010,144 and copending, commonly owned applications Ser. Nos. 07/122,480 now U.S. Pat. No. 5,015,698, 07/351,903 now U.S. Pat. No. 5,089,566 and 07/566,025 (now U.S. Pat. No. 5,132,373). Interest continues, however, in the development of new and alternative compatibilization methods.

The present invention provides polymer blends having numerous favorable properties, including high impact strength, high tensile strength and solvent resistance. It also provides highly compatible polymer blends containing polyphenylene ethers and linear polyesters. The compatibilizing agents in the blends of this invention are addition copolymers containing cyclic ortho ester groups.

Accordingly, the invention is directed to resinous compositions comprising:

(A) at least one polyphenylene ether, or a blend thereof with at least one polymer of an alkenylaromatic compound;

(B) at least one poly(alkylene dicarboxylate);

(C) at least one polyphenylene ether-compatible impact modifier; and (D) an amount effective to compatibilize component A with component B of a copolymer comprising structural units derived from at least one alkenylaromatic compound and structural units of the formula

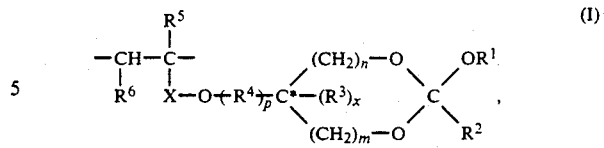

wherein:

$R^1$ is $C_{1-10}$ primary or secondary alkyl or aralkyl or a $C_{6-10}$ aromatic radical or is an alkylene radical forming a second 5- or 6-membered ring with $C^*$, and $R^2$ is $C_{1-10}$ primary or secondary alkyl or aralkyl or a $C_{6-10}$ aromatic radical, or $R^1$ and $R^2$ together with the atoms connecting them form a 5-, 6- or 7-membered ring;

$R^3$ is hydrogen or $C_{1-4}$ primary or secondary alkyl;

$R^4$ is an unsubstituted or substituted $C_{1-6}$ alkylene or $C_{6-10}$ arylene radical;

$R^5$ is hydrogen or methyl;

$R^6$ is hydrogen, $C_{1-6}$ alkyl or a $C_{6-10}$ aromatic radical;

X is a substantially inert linking group;

m is 0 or 1;

n is from 1 to 2-m;

p is 0 or 1; and x is 0 when $R^1$ and $C^*$ form a ring and is otherwise 1.

The polyphenylene ethers (also known as polyphenylene oxides) used as all or part of component A in the present invention are a well known class of polymers. They are widely used in industry, especially as engineering plastics in applications requiring toughness and heat resistance. Since their discovery, they have given rise to numerous variations and modifications all of which are applicable to the present invention, including but not limited to those described hereinafter.

The polyphenylene ethers comprise a plurality of structural units having the formula

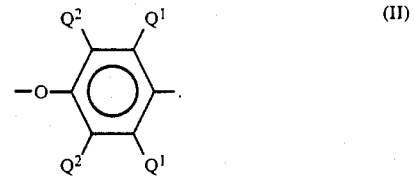

In each of said units independently, each $Q^1$ is independently halogen, primary or secondary lower alkyl (i.e., alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Examples of suitable primary lower alkyl groups are methyl, ethyl, n-propyl, n-butyl, isobutyl, n-amyl, isoamyl, 2-methylbutyl, n-hexyl, 2,3-dimethylbutyl, 2-, 3- or 4-methylpentyl and the corresponding heptyl groups. Examples of secondary lower alkyl groups are isopropyl, sec-butyl and 3-pentyl. Preferably, any alkyl radicals are straight chain rather than branched. Most often, each $Q^1$ is alkyl or phenyl, especially $C_{1-4}$ alkyl, and each $Q^2$ is hydrogen. Suitable polyphenylene ethers are disclosed in a large number of patents.

Both homopolymer and copolymer polyphenylene ethers are included. Suitable homopolymers are those containing, for example, 2,6-dimethyl-1,4-phenylene ether units. Suitable copolymers include random copolymers containing such units in combination with (for example) 2,3,6-trimethyl-1,4-phenylene ether units. Many suitable random copolymers, as well as homopolymers, are disclosed in the patent literature.

Also included are polyphenylene ethers containing moieties which modify properties such as molecular weight, melt viscosity and/or impact strength. Such polymers are described in the patent literature and may be prepared by grafting onto the polyphenylene ether in known manner such vinyl monomers as acrylonitrile and vinylaromatic compounds (e.g., styrene), or such polymers as polystyrenes and elastomers. The product typically contains both grafted and ungrafted moieties. Other suitable polymers are the coupled polyphenylene ethers in which the coupling agent is reacted in known manner with the hydroxy groups of two polyphenylene ether chains to produce a higher molecular weight polymer containing the reaction product of the hydroxy groups and the coupling agent, provided substantial proportions of free hydroxy groups remain present. Illustrative coupling agents are low molecular weight polycarbonates, quinones, heterocycles and formals.

The polyphenylene ether generally has a number average molecular weight within the range of about 3,000–40,000 and a weight average molecular weight within the range of about 20,000–80,000, as determined by gel permeation chromatography. Its intrinsic viscosity is most often in the range of about 0.35–0.6 dl./g., as measured in chloroform at 25° C.

The polyphenylene ethers are typically prepared by the oxidative coupling of at least one corresponding monohydroxyaromatic compound. Particularly useful and readily available monohydroxyaromatic compounds are 2,6-xylenol (wherein each $Q^1$ is methyl and each $Q^2$ is hydrogen), whereupon the polymer may be characterized as a poly(2,6-dimethyl-1,4-phenylene ether), and 2,3,6-trimethylphenol (wherein each $Q^1$ and one $Q^2$ is methyl and the other $Q^2$ is hydrogen).

A variety of catalyst systems are known for the preparation of polyphenylene ethers by oxidative coupling. There is no particular limitation as to catalyst choice and any of the known catalysts can be used. For the most part, they contain at least one heavy metal compound such as a copper, manganese or cobalt compound, usually in combination with various other materials.

A first class of preferred catalyst systems consists of those containing a copper compound. Such catalysts are disclosed, for example, in U.S. Pat. No. 3,306,874, 3,306,875, 3,914,266 and 4,028,341. They are usually combinations of cuprous or cupric ions, halide (i.e., chloride, bromide or iodide) ions and at least one amine.

Catalyst systems containing manganese compounds constitute a second preferred class. They are generally alkaline systems in which divalent manganese is combined with such anions as halide, alkoxide or phenoxide. Most often, the manganese is present as a complex with one or more complexing and/or chelating agents such as dialkylamines, alkanolamines, alkylenediamines, o-hydroxyaromatic aldehydes, o-hydroxyazo compounds, ω-hydroxyoximes (monomeric and polymeric), o-hydroxyaryl oximes and β-diketones. Also useful are known cobalt-containing catalyst systems. Suitable manganese and cobalt-containing catalyst systems for polyphenylene ether preparation are known in the art by reason of disclosure in numerous patents and publications.

Particularly useful polyphenylene ethers for the purposes of this invention are those which comprise molecules having at least one of the end groups of the formulas

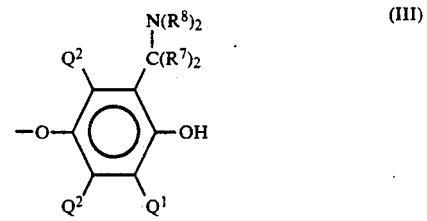

and

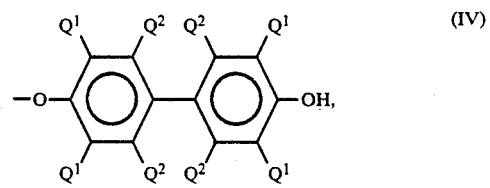

wherein $Q^1$ and $Q^2$ are as previously defined; each $R^7$ is independently hydrogen or alkyl, with the proviso that the total number of carbon atoms in both $R^7$ radicals is 6 or less; and each $R^8$ is independently hydrogen or a $C_{1-6}$ primary alkyl radical. Preferably, each $R^7$ is hydrogen and each $R^8$ is alkyl, especially methyl or n-butyl.

Polymers containing the aminoalkyl-substituted end groups of formula III may be obtained by incorporating an appropriate primary or secondary monoamine as one of the constituents of the oxidative coupling reaction mixture, especially when a copper- or manganese-containing catalyst is used. Such amines, especially the dialkylamines and preferably di-n-butylamine and dimethylamine, frequently become chemically bound to the polyphenylene ether, most often by replacing one of the α-hydrogen atoms on one or more $Q^1$ radicals. The principal site of reaction is the $Q^1$ radical adjacent to the hydroxy groups on the terminal unit of the polymer chain. During further processing and/or blending, the aminoalkyl-substituted end groups may undergo various reactions, probably involving a quinone methide-type intermediate of the formula

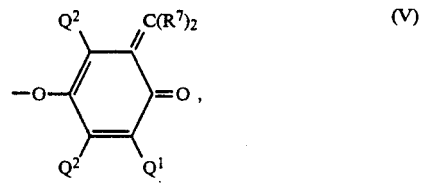

with numerous beneficial effects often including an increase in impact strength and compatibilization with other blend components. Reference is made to U.S. Pat. Nos. 4,054,553, 4,092,294, 4,477,649, 4,477,651 and 4,517,341, the disclosures of which are incorporated by reference herein.

Polymers with 4-hydroxybiphenyl end groups of formula IV are typically obtained from reaction mixtures in which a by-product diphenoquinone of the formula

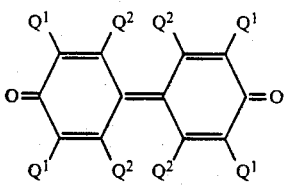 (VI)

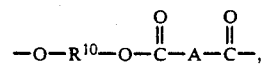 (VIII)

is present, especially in a copper-halide-secondary or tertiary amine system. In this regard, the disclosure of U.S. Pat. No. 4,477,649 is again pertinent as are those of U.S. Pat. Nos. 4,234,706 and 4,482,697, which are also incorporated by reference herein. In mixtures of this type, the diphenoquinone is ultimately incorporated into the polymer in substantial proportions, largely as an end group.

In many polyphenylene ethers obtained under the above-described conditions, a substantial proportion of the polymer molecules, typically constituting as much as about 90% by weight of the polymer, contain end groups having one or frequently both of formulas II and III. It should be understood, however, that other end groups may be present and that the invention in its broadset sense may not be dependent on the molecular structures of the polyphenylene ether end groups.

It will be apparent to those skilled in the art from the foregoing that the polyphenylene ethers contemplated for use in the present invention include all those presently known, irrespective of variations in structural units or ancillary chemical features.

Component A may also contain at least one polymer of an alkenylaromatic compound. Suitable polymers of this type may be prepared by methods known in the art including bulk, suspension and emulsion polymerization. They generally contain at least 25% by weight of structural units derived from an alkenylaromatic monomer of the formula

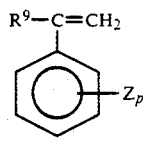 (VII)

wherein $R^9$ is hydrogen, lower alkyl or halogen; Z is vinyl, halogen or lower alkyl; and p is from 0 to 5. These resins include homopolymers of styrene, chlorostyrene and vinyltoluene, random copolymers of styrene with one or more monomers illustrated by acrylonitrile, butadiene, α-methylstyrene, ethylvinylbenzene, divinylbenzene and maleic anhydride, and rubber-modified polystyrenes comprising blends and grafts, wherein the rubber is a polybutadiene or a rubbery copolymer of about 98-78% styrene and about 2-30% diene monomer. These rubber-modified polystyrenes include high impact polystyrene, or HIPS.

The proportion of polystyrene in component A is not critical, since polyphenylene ethers and polystyrenes are miscible in all proportions. Component A will generally contain about 5-50% (by weight) polystyrene, if any.

Component B is at least one linear polyester. The linear polyesters include thermoplastic poly(alkylene dicarboxylates) and alicyclic analogs thereof. They typically comprise structural units of the formula wherein $R^{10}$ is a saturated divalent aliphatic, alicyclic or aromatic hydrocarbon radical containing about 2–10 carbon atoms and A is a divalent aromatic radical containing about 6–20 carbon atoms. They are ordinarily prepared by the reaction of at least one diol such as ethylene glycol, 1,4-butanediol, 1,4-cyclohexanedimethanol or bisphenol A with at least one aromatic dicarboxylic acid such as isophthalic or terephthalic acid, or lower alkyl ester thereof. The poly(alkylene terephthalates), particularly poly(ethylene terephthalate) and poly(butylene terephthalate) and especially the latter, are preferred. Such polyesters are known in the art as illustrated by the following patents:

| | |
|---|---|
| 2,465,319 | 3,047,539 |
| 2,720,502 | 3,671,487 |
| 2,727,881 | 3,953,394 |
| 2,822,348 | 4,128,526. |

Because of the tendency of polyesters to undergo hydrolytic degradation at the high extrusion and molding temperatures encountered by the compositions of this invention, it is preferred that the polyester used as component B be substantially free of water.

The polyesters generally have number average molecular weights in the range of about 20,000–70,000, as determined by intrinsic viscosity (IV) at 30° C. in a mixture of 60% (by weight) phenol and 40% 1,1,2,2-tetrachloroethane.

The compositions of this invention also contain (C) at least one polyphenylene ether-compatible impact modifier. Impact modifiers for polyphenylene ether compositions are well known in the art. They are most often elastomeric polymers, typically derived from one or more monomers selected from the group consisting of olefins, vinyl aromatic monomers, acrylic and alkylacrylic acids and their ester derivatives as well as conjugated dienes. Especially preferred impact modifiers are the rubbery high molecular weight materials including natural and synthetic polymeric materials showing elasticity at room temperature. They include both homopolymers and copolymers, including random, block, radial block, graft and core-shell copolymers as well as combinations thereof.

Polyolefins or olefin-based copolymers employable in the invention include low density polyethylene, high density polyethylene, linear low density polyethylene, isotactic polypropylene, poly(1-butene), poly(4-methyl-1-pentene), propylene-ethylene copolymers and the like. Additional olefin copolymers include copolymers of one or more α-olefins, particularly ethylene, with copolymerizable monomers including, for example, vinyl acetate, acrylic acid and alkylacrylic acids as well as the ester derivatives thereof including, for example, ethyl acrylate, methyl methacrylate and the like. Also suitable are the ionomer resins, which may be wholly or partially neutralized with metal ions.

A particularly useful class of impact modifiers are those derived from the vinyl aromatic monomers. These include AB and ABA type block and radial block copolymers and vinyl aromatic conjugated diene core-shell graft copolymers.

An especially preferred subclass of vinyl aromatic monomer-derived resins is the block copolymers comprising monoalkenyl arene (usually styrene) blocks and conjugated diene (e.g., butadiene or isoprene) or olefin (e.g., ethylene-propylene, ethylene-butylene) blocks and represented as AB and ABA block copolymers. The conjugated diene blocks may be partially or entirely hydrogenated, whereupon the properties are similar to the olefin block copolymers.

Suitable AB type block copolymers are disclosed in, for example, U.S. Pat. Nos. 3,078,254; 3,402,159; 3,297,793; 3,265,765 and 3,594,452 and UK Patent 1,264,741, all incorporated herein by reference. Exemplary of typical species of AB block copolymers are polystyrene-polybutadiene (SBR), polystyrene-polyisoprene and poly(alpha-methylstyrene)-polybutadiene. Such AB block copolymers are available commercially from a number of sources, including Phillips Petroleum under the tradename SOLPRENE.

Additionally, ABA triblock copolymers and processes for their production as well as hydrogenation, if desired, are disclosed in U.S. Pat. Nos. 3,149,182; 3,231,635; 3,462,162; 3,287,333; 3,595,942; 3,694,523 and 3,842,029, all incorporated herein by reference.

Examples of triblock copolymers include polystyrene-polybutadiene-polystyrene (SBS), polystyrene-polyisoprene-polystyrene (SIS), poly($\alpha$-methylstyrene)-polybutadiene-poly($\alpha$-methylstyrene). and poly($\alpha$-methylstyrene)-polyisoprene-poly($\alpha$-methylstyrene). Particularly preferred triblock copolymers are available commercially as CARIFLEX®, KRATON D® and KRATON G® from Shell.

Another class of impact modifiers is derived from conjugated dienes. While many copolymers containing conjugated dienes have been discussed above, additional conjugated diene modifier resins include, for example, homopolymers and copolymers of one or more conjugated dienes including, for example, polybutadiene, butadiene-styrene copolymers, isoprene-isobutylene copolymers, chlorobutadiene polymers, butadiene-acrylonitrile copolymers, polyisoprene, and the like. Ethylene-propylene-diene monomer rubbers may also be used. These EPDM's are typified as comprising predominantly ethylene units, a moderate amount of propylene units and up to about 20 mole percent of non-conjugated diene monomer units. Many such EPDM's and processes for the production thereof are disclosed in U.S. Pat. Nos. 2,933,480; 3,000,866; 3,407,158; 3,093,621 and 3,379,701, incorporated herein by reference.

Other suitable impact modifiers are the core-shell type graft copolymers. In general, these have a predominantly conjugated diene rubbery core or a predominantly crosslinked acrylate rubbery core and one or more shells polymerized thereon and derived from monoalkenylarene and/or acrylic monomers alone or, preferably, in combination with other vinyl monomers. Such core-shell copolymers are widely available commercially, for example, from Rohm and Haas Company under the trade names KM-611, KM653, KM-330, and are described in U.S. Pat. Nos. 3,808,180; 4,034,013; 4,096,202; 4,180,494 and 4,292,233.

Also useful are the core-shell copolymers wherein an interpenetrating network of the resins employed characterizes the interface between the core and shell. Especially preferred in this regard are the ASA type copolymers available from General Electric Company and sold as GELOY ™ resin and described in U.S. Pat. No. 3,944,631.

In addition, there may be employed the above-described polymers and copolymers having copolymerized therewith or grafted thereon monomers having functional groups and/or polar or active groups. Finally, other suitable impact modifiers include Thiokol rubber, polysulfide rubber, polyurethane rubber, polyether rubber (e.g., polypropylene oxide), epichlorohydrin rubber, ethylene-propylene rubber, thermoplastic polyester elastomers and thermoplastic ether-ester elastomers.

The compatibilizing agent (component D) in the compositions of this invention is a copolymer comprising structural units derived from at least one alkenylaromatic compound and structural units of formula I. Suitable alkenylaromatic compounds are described hereinabove with reference to component A; styrene is generally preferred.

An essential feature of the polymers useful as component D is the presence of cyclic ortho ester moieties. The $R^1$ value therein may be a $C_{1-4}$ primary or secondary alkyl radical such as methyl, ethyl, n-propyl, isopropyl, n-butyl, isobutyl or secondary butyl, or an aralkyl or aromatic radical as defined above. Any substituents should be non-reactive under the conditions of the invention; examples are halo, nitro and alkoxy. Unsubstituted primary radicals and especially the methyl radical are generally preferred.

It is also possible for $R^1$ to form a second 5-or 6-membered ring with other portions of the molecule. For this purpose, one of the carbon atoms in the ortho ester ring is designated C* to indicate its role as part of said second ring.

The $R^2$ value may be a $C_{1-4}$ primary or secondary alkyl, aralkyl or aromatic radical as defined above for $R^1$. It is also possible for $R^1$ and $R^2$ together to form a 5-, 6- or 7-membered ring with the atoms connecting them. Thus, the invention includes compositions prepared from certain spiro ortho ester compounds.

The $R^3$ radical may be hydrogen or an alkyl radical similar to $R^1$ and $R^2$. It is preferably hydrogen.

The $R^4$ radical is an unsubstituted or substituted $C_{1-6}$ alkylene radical, any substituents being inert to ortho ester formation and reaction with acyl, alkyl and aralkyl chlorides; e.g., alkoxy. Preferably, $R^4$ is methylene.

The $R^6$ radical may be hydrogen, alkyl or aryl as previously defined. It is preferably hydrogen.

The X value may be any linking group which is substantially inert under the conditions of formation and polymerization of the cyclic ortho esters and copolymer formation from polymers thereof. Those skilled in the art will understand that a wide variety of groups fit this description, and the invention is not limited in that respect. Suitable X groups include unsubstituted and substituted divalent aliphatic, alicyclic and aromatic radicals and combinations thereof, any substituents being of the type previously described. Said radicals may be attached to other divalent radicals such as carbonyl, sulfone, carbamoyl, disubstituted silicon and alkyl- and arylphosphoryl. The preferred X groups have the formulas

and

-continued

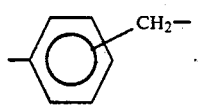

The polymers useful as component D include those of the type which may be prepared from acrylic and methacrylic acid esters, wherein X has formula IX, as well as vinylbenzyl ethers, wherein X has formula X. Both vinyl-derived ($R^5$ is hydrogen) and isopropenyl-derived ($R^5$ is methyl) polymers are included; for example, polymers of acrylic and methacrylic acid esters. For the most part, $R^5$ is preferably hydrogen when X has formula X.

The values of m and n depend on whether the cyclic ortho ester moiety is a 5-membered or 6-membered ring. In general, 5-membered rings are preferred; that is, m is 0 and n is 1. However, the invention also includes polymers in which a 6-membered ring is present, which requires either than m and n both be 1 or that m be 0 and n be 2.

Also included are polymers in which p is 0; that is, polymers in which the ortho ester groups do not contain an $R^4$ value. Most often, p will be 0 when the ortho ester ring is a 6-membered ring and m and n are each 1.

Many of the ethylenically unsaturated cyclic ortho esters which may be converted to polymers useful as component D are disclosed and claimed in copending, commonly owned application Ser. No. 07-716157, now U.S. Pat. No. 5,153,290. Esters of this type may be prepared by the reaction of a hydroxy-substituted ortho ester of the formula

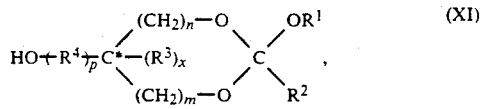

wherein $R^{1-4}$, m, n, p and x are as previously defined, with a suitable reagent such as acryloyl chloride, methacryloyl chloride or a vinylbenzyl chloride. Said reaction takes place under conventional conditions. In the case of acryloyl chloride or methacryloyl chloride, it typically occurs in the presence of a tertiary amine as acid acceptor and in solution in a relatively non-polar organic solvent. The hydroxy-substituted ortho ester and acryloyl or methyacryloyl chloride may be employed in approximately equimolar amounts, or the chloride may be employed in slight excess. The amine is generally present in excess, to ensure neutralization of all the acidic by-product formed.

Reaction between the hydroxy-substituted ortho ester and vinylbenzyl chloride is also conducted under conventional conditions, typically in the presence of an alkaline reagent such as sodium hydroxide. Again, the hydroxy-substituted ortho ester and vinylbenzyl chloride may be employed in roughly equimolar amounts, or, in this case, an excess of the ortho ester may be employed. The molar proportion of base is generally about equal to that of ortho ester. No solvent is generally necessary, although one may be employed if desired.

The preparation of ethylenically unsaturated cyclic ortho esters is illustrated by the following examples. Molecular structures of all products in Examples 1-4 were confirmed by proton and carbon-13 nuclear magnetic resonance spectroscopy.

EXAMPLE 1

A 5-liter 3-necked flask fitted with a mechanical stirrer, pressure equalizing addition funnel and nitrogen inlet was charged with 301 grams (2.03 moles) of 4-hydroxymethyl-2-methoxy-2-methyl-1,3-dioxolane, 514 grams (5.08 moles) of triethylamine and 2 liters of methylene chloride. The flask was immersed in an ice-water bath and 193.1 grams (2.13 moles) of acryloyl chloride was added over 50 minutes under nitrogen, with stirring. The mixture was stirred at room temperature overnight and the filtrate was washed twice with 2-liter portions of water, dried over magnesium sulfate, filtered and vacuum stripped. A free radical inhibitor, 3-t-butyl-4-hydroxy-5-methylphenyl sulfide, was added in the amount of 200 ppm. to the residue which was then distilled under vacuum. The desired 4-acryloyloxymethyl-2-methoxy-2-methyl-1,3-dioxolane distilled at 80°–85° C./0.5–1.0 torr.

EXAMPLE 2

The procedure of Example 1 was repeated, employing 281 grams (1.9 moles) of 4-hydroxymethyl-2-methoxy-2-methyl-1,3-dioxolane, 481 grams (4.76 moles) of triethylamine and 199 grams (1.9 moles) of methacryloyl chloride. The product, 4-methacryloyloxymethyl-2-methoxy-2-methyl-1,3-dioxolane, was collected at 80° C./0.4 torr.

EXAMPLE 3

The procedure of Example 1 was repeated, employing 21 grams (100 mmol.) of 4-hydroxymethyl-2-methoxy-2-phenyl-1,3-dioxolane, 25.3 grams (250 mmol.) of triethylamine, 9.5 grams (105 mmol.) of acryloyl chloride and 150 ml. of methylene chloride. The crude product was purified by column chromatography over basic alumina, using 15% (by volume) ethyl acetate in hexane as an eluant, to yield the desired 4-acryloyloxymethyl-2-methoxy-2-phenyl-1,3-dioxolane.

EXAMPLE 4

A 4-necked 250-ml. round-bottomed flask equipped with a mechanical stirrer, a pressure equalizing addition funnel, a condenser and a thermometer was charged with 51.9 grams (350 ml.) of 4-hydroxymethyl-2-methoxy-2-methyl-1,3-dioxolane and 14.01 grams (350 mmol.) of powdered sodium hydroxide. The slurry was stirred for 15 minutes under nitrogen, after which 41.1 grams (270 mmol.) of vinylbenzyl chloride (isomeric mixture) was added dropwise over 10 minutes. The mixture was heated to 80° C., whereupon an exothermic reaction took place which caused the temperature to rise to 140° C. The mixture was stirred overnight under nitrogen, diluted with 400 ml. of methylene chloride and 5 ml. of triethylamine and washed twice with 250 ml. of aqueous sodium chloride solution. The organic layer was dried over magnesium sulfate, filtered and vacuum stripped, and the residue was purified by column chromatography over basic alumina using a 2:1 (by volume) mixture of hexane and methylene chloride as eluant. There was obtained the desired isomeric mixture of 4-(2-methoxy-2-methyl-1,3-dioxolanyl)methyl vinylbenzyl ethers.

The copolymers used as component D are preferably random addition copolymers, but the use of block and graft copolymers is also within the scope of the invention. The proportion of units of formula I in the copolymer is generally in the range of about 1–5, most often about 2–4 and preferably about 2.3–4.0 mole percent. Copolymers employing the latter range often afford compositions with high impact strength over a particularly wide range of proportions of component D.

Weight average molecular weights for polymers employed as component D, as determined by gel permeation chromatography, may be in the range of about 10,000–500,000, usually about 30,000–125,000. It is often found that the use of lower molecular weight polymers results in the formation of blends with particularly high impact strengths, and therefore polymers having weight average molecular weights of about 40,000–75,000 are often preferred.

The copolymers useful as component D may be prepared by free radical addition polymerization methods known in the art. Polymerization may be effected in bulk, solution, suspension or emulsion, by contacting the monomer or monomers with a polymerization initiator either in the absence or presence of a diluent at a temperature in the range of about 0°–200° C. Suitable initiators include benzoyl peroxide, hydrogen peroxide, azobisisobutyronitrile, persulfate-bisulfite, persulfate-sodium formaldehyde sulfoxylate, chlorate-sulfite and the like. Alternatively, polymerization may be effected by irradiation techniques, as by ultraviolet, electron beam or plasma irradiation.

The preparation of copolymers useful as component D is illustrated by the following examples.

EXAMPLE 5

A 5-liter 3-necked flask equipped with a reflux condenser and nitrogen purge means, a mechanical stirrer and a thermometer was charged with 936 grams (9 moles) of styrene, 960 ml. of methyl ethyl ketone, 960 mg. of azobisisobutyronitrile and 31 grams (150 mmol.) of the product of Example 1. The solution was purged with nitrogen for 30 minutes, after which it was heated at 70° C. under nitrogen for 15 hours. An additional 600 ml. of methyl ethyl ketone and 500 mg. of azobisisobutyronitrile were added and stirring and heating were continued at 70° C. for 4 hours. The solution was cooled to room temperature and poured into twice its volume of methanol, with rapid stirring. The precipitated product was filtered, slurried several times in methanol and refiltered, and vacuum dried at 60° C. for 48 hours. It was shown by nuclear magnetic resonance and Fourier transform infrared spectroscopy to be the desired copolymer of styrene and the ortho ester acrylate, containing 2.2 mole percent ortho ester groups. Its weight average molecular weight was 102,000.

EXAMPLE 6

Following the procedure of Example 5, a polymer containing about 2.5 mole percent ortho ester groups was prepared by the reaction of 498 grams (4.79 moles) of styrene with 21.8 grams (108 mmol.) of the product of Example 1 in 346 ml. of toluene, using 5.2 grams of azobisisobutyronitrile. The reaction mixture was diluted with an additional 500 ml. of toluene prior to isolation of the product, which had a molecular weight of about 50,000.

EXAMPLE 7

Following the procedure of Example 6, a product containing 1.6 mole percent ortho ester groups was prepared by the reaction of 359 grams (3.45 moles) of styrene, 20 grams (76 mmol.) of the product of Example 4, 252 ml. of toluene and 3.79 grams of azobisisobutyronitrile. Its molecular weight was 58,000.

The proportions of components in the compositions of this invention are subject to wide variation, the sole limitation being that component D should be present in an amount effective to compatibilize components A and B. Illustrative and preferred approximate component ranges are as follows, all percentages being by weight:

| Component | Illustrative | Preferred |
| --- | --- | --- |
| A | 15–50% | 15–35% |
| B | 20–80% | 50–70% |
| C | 5–25% | 10–15% |
| D | 2–15% | 3–10% |

It is within the scope of the invention for the composition to contain other conventional ingredients such as fillers, flame retardants, pigments, dyes, stabilizers, antistatic agents, mold release agents and the like. The presence of other resinous components is also contemplated. These include impact modifiers compatible with component B, such as various graft and core-shell copolymers of such monomers as butadiene, styrene, butyl acrylate and methyl methacrylate.

Also included as other resinous components are other impact and processability modifiers for component A, such as olefin copolymers. In general, the amounts of any other resinous components, if present, will not exceed about 15% by weight of total resins.

The preparation of the compositions of this invention is normally achieved by merely blending the ingredients thereof under conditions adapted for the formation of an intimate blend. The precise order of blending is not believed to be critical, except that components B and D should not be preblended under melt conditions since this may cause substantial degradation of properties such as impact strength.

Suitable blending methods include solution blending, although such procedures are of limited applicability to polyesters by reason of their insolubility in most common solvents. For this reason and because of the availability of melt blending equipment in commercial polymer processing facilities, melt blending procedures are generally preferred.

Conventional melt blending procedures and equipment may be employed. Those skilled in the art will be familiar with blending methods and apparatus capable of intimately blending resinous constituents, especially by kneading. They are exemplified by disc-pack processors and various types of extrusion equipment. Illustrations of the latter are continuous mixers; single screw kneading extruders; corotating, intermeshing and counterrotating, non-intermeshing twin screw extruders having such features as staggered configuration screws, forward-flighted compounders, cylindrical bushings and left-handed screw elements; and extruders having screws which include at least one and preferably two kneading block elements. Melt blending temperatures are generally in the range of about 100°–325° C.

The invention is illustrated by the following examples.

EXAMPLES 8–21

Blends were prepared by tumble mixing the dry constituents on a treadmill followed by extrusion on a 20-mm. twin screw extruder at temperatures in the range of 120°–270° C., with vacuum venting unless otherwise specified. The extrudates were cooled in water, pelletized, dried at 110° C. for 3 hours and molded into test bars which were evaluated for notched Izod impact strength according to ASTM procedure D256.

The components employed were as follows:
Component A-a poly (2,6-dimethyl-1,4-phenylene ether) having an intrinsic viscosity in chloroform at 25° C. of 0.41 dl./g.
Component B-a poly(butylene terephthalate) having a number average molecular weight, as determined by gel permeation chromatography, of about 50,000.
Component C-a commercially available triblock copolymer with polystyrene endblocks having weight average molecular weights of about 29,000 and a hydrogenated butadiene midblock having a weight average molecular weight of 116,000.
Component D-the products of Examples 5–7.

The results are given in the following table, in comparison with three controls.

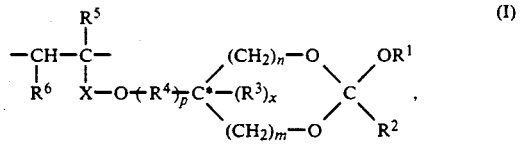

wherein:
$R^1$ is $C_{1-10}$ primary or secondary alkyl or aralkyl or a $C_{6-10}$ aromatic radical or is an alkylene radical forming a second 5- or 6-membered ring with $C^*$, and $R^2$ is $C_{1-10}$ primary or secondary alkyl or aralkyl or a $C_{6-10}$ aromatic radical, or $R^1$ and $R^2$ together with the atoms connecting them form a 5-, 6- or 7-membered ring;
$R^3$ is hydrogen or $C_{1-4}$ primary or secondary alkyl;
$R^4$ is an unsubstituted or substituted $C_{1-6}$ alkylene or $C_{6-10}$ arylene radical;
$R^5$ is hydrogen or methyl;
$R^6$ is hydrogen, $C_{1-6}$ alkyl or a $C_{6-10}$ aromatic radical;

| Example | Component A, parts | Component B, parts | Component C, parts | Component D Identity | Component D Parts | Impact strength joules/m. |
|---|---|---|---|---|---|---|
| 8 | 20 | 56 | 14 | Ex. 5 | 10 | 753 |
| 9* | 20 | 56 | 14 | Ex. 5 | 10 | 694 |
| 10 | 20.7 | 57.8 | 14 | Ex. 5 | 7.5 | 552*** |
| 11 | 25 | 56 | 14 | Ex. 5 | 5 | 111 |
| 12 | 21 | 60 | 14 | Ex. 5 | 5 | 96 |
| 13 | 25 | 60 | 14 | Ex. 5 | 5 | 69 |
| 14 | 30 | 55 | 10 | Ex. 5 | 5 | 61 |
| 15 | 32 | 55 | 10 | Ex. 5 | 3 | 41 |
| 16 | 20 | 56 | 14 | Ex. 6 | 10 | 732 |
| 17 | 20.7 | 57.8 | 14 | Ex. 6 | 7.5 | 716 |
| 18 | 21.3 | 59.7 | 14 | Ex. 6 | 5 | 748 |
| 19 | 21.8 | 61.2 | 14 | Ex. 6 | 3 | 61 |
| 20 | 20.7 | 57.8 | 14 | Ex. 7 | 7.5 | 678 |
| 21 | 21.3 | 59.7 | 14 | Ex. 7 | 5 | 182 |
| Control A | 23 | 63 | 14 | — | 0 | 18 |
| Control B | 24 | 67 | 0 | Ex. 6 | 9 | 14 |
| Control C | 20 | 56 | 14 | ** | 10 | 13 |

*Not vacuum vented.
**Homopolystyrene.
***Average value.

Several conclusions can be drawn from the results in the table. In the first place, all of the compositions of this invention were ductile and had impact strengths materially higher than those of the controls, which were brittle. In the second place, a comparison of Examples 8 and 9 indicates that vacuum venting is not essential. In the third place, a comparison of the listed products indicates that the ortho ester copolymer of Example 6, containing about 2.5 mole percent ortho ester groups, affords compositions with high impace strengths over a particularly wide range of proportions of component D.

What is claimed is:
1. A resinous composition comprising:
(A) at least one polyphenylene ether, or a blend thereof with at least one polymer of an alkenylaromatic compound;
(B) at least one poly(alkylene dicarboxylate);
(C) at least one polyphenylene ether-compatible impact modifier; and
(D) an amount effective to compatibilize component A with component B of a random addition copolymer comprising structural units derived from at least one alkenylaromatic compound and structural units of the formula

X is a substantially inert linking group;
m is 0 or 1;
n is from 1 to 2-m;
p is 0 or 1; and
x is 0 when $R^1$ and $C^*$ form a ring and is otherwise 1.
2. A composition according to claim 1 wherein component A is a poly(2,6-dimethyl-1,4-phenylene ether).
3. A composition according to claim 2 wherein component B is a poly(ethylene terephthalate) or a poly(butylene terephthalate).
4. A composition according to claim 3 wherein component C is a triblock copolymer wherein the end blocks are derived from styrene and the midblock is derived from at least one of isoprene and butadiene.
5. A composition according to claim 4 wherein the aliphatic unsaturation in the midblock of component C has been decreased by selective hydrogenation.
6. A composition according to claim 5 wherein component B is a poly(butylene terephthalate).
7. A composition according to claim 3 wherein each of $R^1$ and $R^2$ is alkyl or an aromatic radical and x is 1.
8. A composition according to claim 7 wherein m is 0 and n is 1.
9. A composition according to claim 8 wherein $R^3$ and $R^6$ are each hydrogen.

10. A composition according to claim 9 wherein p is 1 and $R^4$ is methylene.

11. A composition according to claim 10 wherein $R^2$ is methyl or phenyl.

12. A composition according to claim 11 wherein the alkenylaromatic compound units in component D are styrene units.

13. A composition according to claim 12 wherein X is

14. A composition according to claim 13 wherein $R^5$ is hydrogen.

15. A composition according to claim 14 wherein $R^5$ is methyl.

16. A composition according to claim 12 wherein X is

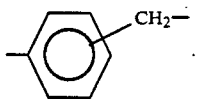

17. A composition according to claim 12 wherein the proportion of units of formula I in component D is in the range of about 2-4 mole percent.

18. A composition according to claim 17 wherein the proportions of components are as follows, all percentages being by weight:
Component A-about 15-35%;
Component B-about 50-70%;
Component C-about 10-15%;
Component D-about 3-10%.

19. A composition according to claim 18 wherein the proportion of units of formula I in component D is in the range of about 2.3-4.0 mole percent.

* * * * *